United States Patent [19]
Rehberg

[11] Patent Number: 4,995,943
[45] Date of Patent: Feb. 26, 1991

[54] PRETREATMENT OF CELLULOSIC MATERIAL WITH CARBON DIOXIDE

[76] Inventor: Karl H. Rehberg, P.O. Drawer 2868, Lakeland, Fla. 33806

[21] Appl. No.: 228,142

[22] Filed: Aug. 4, 1988

Related U.S. Application Data

[63] Continuation-in-part of Ser. No. 814,144, Dec. 27, 1985, abandoned.

[51] Int. Cl.$^5$ .......................... D21C 1/00; D21C 1/04
[52] U.S. Cl. ........................................ 162/63; 127/37; 162/50
[58] Field of Search .................. 162/24, 19, 63, 18, 162/50, 56, 60, 76; 127/37

[56] References Cited

U.S. PATENT DOCUMENTS

| | | | |
|---|---|---|---|
| 1,790,260 | 1/1931 | Cable | 162/63 |
| 3,558,428 | 1/1971 | Asplund | 162/19 |
| 3,711,366 | 1/1973 | Nakano | 162/24 |
| 3,726,756 | 4/1973 | Polak | 162/63 |

OTHER PUBLICATIONS

Rydholm; "Pulping Processes"; Interscience Publishers, N.Y., Sep. 1967, pp. 294-305.
Casey; *Pulp & Paper*, 2nd Ed., vol. I; Interscience Publishers, Inc.; N.Y., 1960, pp. 1372-1375.

*Primary Examiner*—Steve Alvo
*Attorney, Agent, or Firm*—Charles A. McClure

[57] ABSTRACT

Pretreatment of cellulosic material with carbon dioxide gas, preparatory to being converted chemically, as by hydrolysis, etc. Biomass material, such as branches, stalks, brush, or foliage, or cellulosic products, such as waste paper or cardboard, is reduced to finely divided dry form and is exposed to carbon dioxide in an anhydrous environment, is compressed to superatmospheric pressure and then is decompressed to subatmospheric pressure, expelling air and other gases, particulates, water, other volatiles, etc. Then the cellulosic material is returned to atmospheric pressure, and subsequently is either recycled through such compression and decompression and return, or is compressed to even high pressure. Such environment is enriched in carbon dioxide, such as comprising it in substantial or major part or consisting essentially thereof.

1 Claim, 2 Drawing Sheets 4,995,943

PRETREATMENT OF CELLULOSIC MATERIAL WITH CARBON DIOXIDE

This application is a continuation-in-part of my co-pending U.S. Pat. application, Ser. No. 814,144 filed Dec. 27, 1985, now abandoned.

FIELD OF THE INvENTION

This application relates to treatment of biomass or other forms of cellulosic material preliminary to chemical conversion thereof, as for the purposes of modifying the structure thereof, as to increase receptivity or susceptibility to such conversion.

BACKGROUND OF THE INVENTION

"Biomass" is a principal source of cellulosic material and is one of the world's most abundant resources, being renewable via recurring plant growth. Hence, many efforts have been made to use it as a chemical feedstock, as in saccharification processes, for example. However, biomass and other cellulosic materials take so many diverse forms and are inherently so intractable as to make extreme demands upon design and control of any desired process.

Accordingly, it is convenient to subdivide chemical conversion of cellulosic material into successive stages, the first of which is usually called "pretreatment." The purposes of pretreatment include modification of physical or physical-chemical structure to render the cellulosic material more readily hydrolyzed or otherwise chemically converted subsequently.

Examples of known pretreatments of cellulosic material include application of strong acid, as by Classen in several patents, such as U.S. Pat. No. 695,795; alkali, as by Cross in U.S. Pat. No. 807,250; and weak acid, as by Corti in U.S. Pat. No. 826,299. Treatment by steam had (and has) numerous proponents, such as Tomlinson in many patents, including U.S. Pat. 1,032,443. Even more exotic pretreating agents have been employed, such as chlorine gas and sodium chloride (in electrolytic vessels), as by Gerull in U.S. Pat. No. 3,489,742; oxygen and alkali, as by Jividen et al. in U.S. Pat. No. 4,087,386; and metal chelates, as by Tsao in U.S. Pat. Nos. 4,174,976 and 4,265,675.

Cellulose pretreatments known in the prior art have the defect of either degrading its structure chemically to such an extent that the resulting increased type or variety of compositions becomes even less desirable and more difficult to control, or even introducing some additional undesirable compositions (or both). A successful pretreatment of cellulosic material ought to have the advantageous effects of modifying its composition and structure so as to improve its susceptibility to intended subsequent chemical conversion, and preferably to a range of chemical conversion processes or steps.

The present invention is designed to remedy the noted defects and to provide the suggested advantages, in a novel straightforward way without introducing additional difficulties into processing of biomass or other cellulosic materials.

SUMMARY OF THE INVENTION

A primary object of the present invention is to enhance the utility of biomass and other cellulosic materials to such subsequent chemical conversion treatments as hydrolysis.

Another object of this invention is to avoid undesirable degradation of cellulosic material in dry pretreatment thereof.

A further object of the invention is to pretreat cellulosic material so as to remove gaseous and liquid compositions, such as air and water, that would be detrimental to subsequent treatment.

Yet another object is to pretreat cellulosic material in such batchwise manner as to enable subsequent continuous flow treatment.

A still further object is to do the foregoing in an expeditious and economical manner.

In general, the objects of the present invention are attained by pretreating cellulosic material, in finely divided dry form, by confining it in an environment rich in carbon dioxide, subjecting it to compression in such atmosphere, and then decompressing it.

More particularly, the cellulosic material is first subjected to superatmospheric pressure and to superambient temperature in such atmosphere for a period of time, then is rapidly decompressed to subatmospheric pressure, expelling the environmental gas along with residual gases, oils, resins, water, finer particulates, other volatiles, etc., and then is returned to ambient pressure. Such pressure-temperature cycle may be repeated if desired. Preferred as a final step when conversion is imminent is repressurization of the cellulosic material to an even higher pressure with carbon dioxide at appreciably subambient temperature.

Altogether such pretreatment enhances the susceptibility of cellulosic material to subsequent chemical conversion. It renders available, in the cellulosic material, potentially reactive sites that otherwise might remain physically or chemically unavailable, increasing the porosity and available surface area in so doing. It also renders the cellulosic material peculiarly susceptible to subsequent chemical conversion by saccharification.

Other objects of the present invention, together with means and methods for achieving the various objects, will become readily apparent from the following description and accompanying drawings of preferred embodiments thereof, which are presented by way of example rather than limitation.

DETAILED DESCRIPTION OF THE INVENTION

Figure 1:
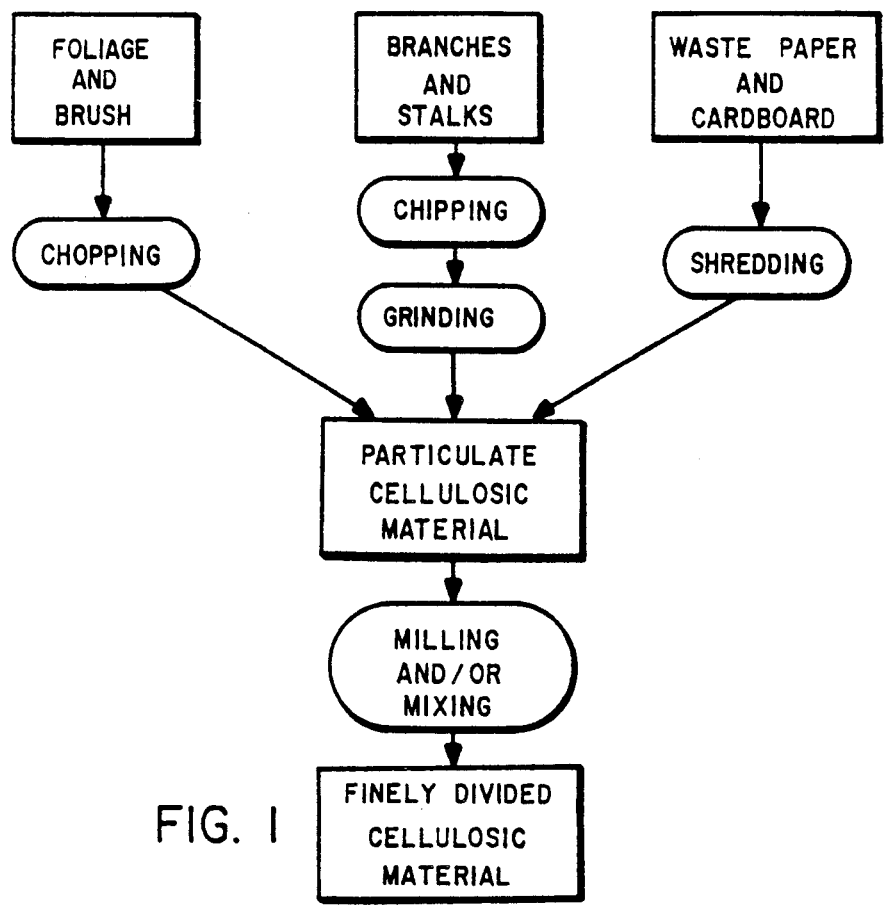
FIG. 1 is a block diagram of reduction of cellulosic material to particulate form for pretreatment, according to this invention.

FIG. 1 shows schematically comminution of several types of cellulosic material (one cellulosic product and two biomass) as at stages of being reduced from their original form to a particulate form preferred according to this invention—preferably finer than coarsest sawdust but not so fine as wood flour At the top center, branches and stalks are being subjected sequentially to chipping and then grinding steps, whereas at the left foliage and brush are being subjected to a chopping step, and at the right waste paper and cardboard are being subjected to a shredding step—somewhat more regular in its action than the chopping step, inasmuch as waste paper and cardboard exhibit a greater degree of uniformity than foliage and brush are likely to do. As both the chopped and shredded materials are more likely to have been small in one or two dimensions before being subdivided (than are branches and stalks), they often can bypass the grinding step and proceed, together with the ground product from the infeed of branches and stalks, to a mixing and/or milling (cold) step. The resulting mixture of finely divided solid particulates is then ready for pretreatment proper.

It will be understood that the feed materials in FIG. 1 are in their naturally dry state when fed into and through the appropriate devices, which may be partly or wholly conventional, for performing the various comminuting steps. Water content is distributed partly over the greatly increased surface area, and is partly evaporated, so that it does not render the resulting particulate material wet. The comminution is carried out at pressures low enough to preclude localized hot-spot degradation of the cellulosic material.

Figure 2:
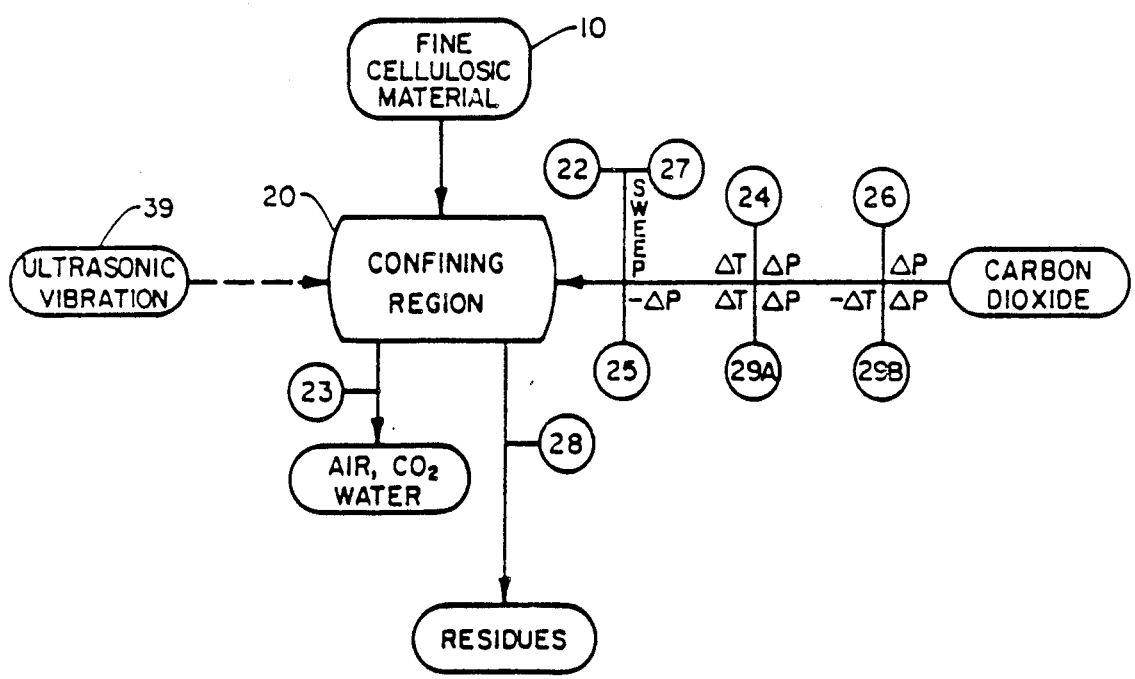
FIG. 2 is a block diagram of pretreatment of such particulate cellulosic material, according to this invention.

FIG. 2 shows schematically the pretreatment of such cellulosic particulate material according to this invention. The center block designates confining region 20, into which and from which cellulosic and other materials enter and exit, as shown by arrows above, below, and at the sides of the confining region. The region (with contents) is heated, pressurized, decompressed, etc., as indicated by adjacent symbols, in the order shown by encircled reference numerals. Such numerals represent the various sequential steps, as noted between the confining region block and blocks for the respective materials, designated both by reference numerals and by descriptive legends.

Thus, FIG. 2 shows that finely divided cellulosic material 10 is introduced into confining region 20, in step 21. Then, in step 22, the region is swept with warm anhydrous gas, rich in carbon dioxide (as explained further below) and here called simply carbon dioxide 30. Accordingly, both air and carbon dioxide are expelled, in step 23. Next, the confining region (with contents) is pressurized with warm carbon dioxide, in step 24, to a moderate superatmospheric pressure Then the region is decompressed and the pressure therein is reduced, in step 25, to a subatmospheric level (or "vacuum") removing, along with environmental carbon dioxide, what is called here residues, etc. The residues are designated by reference numeral 35 and comprise any residual air, water vapor, dust or other fine particulates, oils or other volatiles, etc.

To complete the pressure cycle, confining region 20 (with its contents) is returned to ambient pressure, in step 26, and then is swept again by carbon dioxide in step 27, to remove any remaining residues 35, in step 28. The pretreated material may be stored for later use, be repressurized with warm carbon dioxide to repeat the cycle, as along dotted line 29A, or instead be repressurized to a higher pressure with cool carbon dioxide, as designated by dashed line 29B, as when it is to be fed immediately to a conversion step.

At the left side of confining region 10 and connected thereto by a broken line terminating in an arrowhead is ancillary step 39 of ultrasonic vibration applied to the contents of the region, especially during the high pressures of steps 24 and 29A or 29B. Vibratory frequencies of about 40 to 60 kHz have proved suitable. In general, applied ultrasonic energy has the effect of rendering the interior of the cellulosic material more open and accessible, not only to agents applied in the pretreatment steps of the present invention but also to others, such as are used in saccharification hydrolysis or other types of chemical conversion of cellulose.

Figure 3:
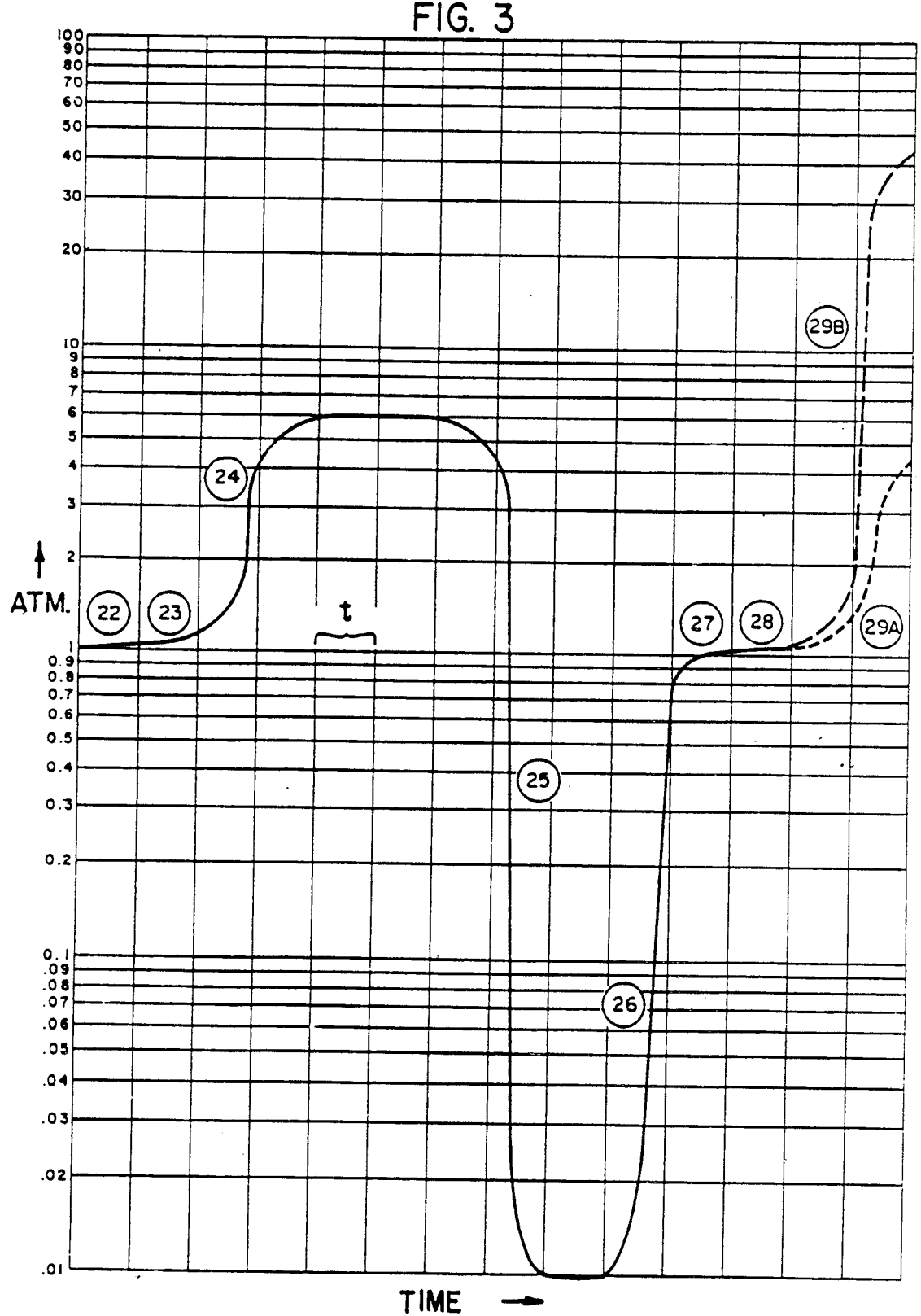
FIG. 3 is a graph of the pretreatment of FIG. 2 in terms of pressure versus time.

FIG. 3 graphs the successive steps (after step 21) of such anhydrous pretreatment, as just described and shown in FIG. 2, in terms of the pressure and time relationship in confining region 10. Superatmospheric pressures are above, and subatmospheric pressures below, the abscissa. Time begins at the left, being zero at the ordinate intercept, and increasing to the right along the abscissa at an ambient pressure of one atmosphere. The pressure scale is logarithmic, in atmospheres; the time scale is uniform, in units (t) representing a range of time from about one to a dozen minutes, most likely about one-twelfth or one-tenth hour, i.e., 5 or 6 mins. It should be borne in mind that this graph is intended chiefly to convey the direction and approximate extent—and only secondarily the approximate duration—of the pressure steps, numbered here in like manner as in FIG. 2.

No attempt is made in FIG. 3 to indicate the temperatures of the cellulosic material or the environmental gas at any stage in the pressure cycle. The initial pressurization is accomplished with gas at mildly superambient temperature, preferably between 25° and 35° C. In the superpressurization step (29B) a much cooler gas temperature is employed, closer to zero, such as about 0° to 5° C.

Thus, FIG. 3 shows a slight rise in pressure during injection of environmental gas, in step 22, maintained during the sweeping of air from the region, in step 23. Injection of more environmental gas after cessation of the sweeping raises the pressure (as well as the temperature) in the region, in step 24, to a moderate level, on the order of a half dozen atmospheres, where it remains for at least several (preferably about a dozen) minutes. Then the confining region—including its contents—is decompressed, in step 25, the pressure being reduced to subatmospheric, on the order of hundredths of an atmosphere, where it remains for a somewhat lesser period of time (about half as long). Finally, more environmental gas is supplied to the region, and the confining region and its contents are returned to ambient pressure, in step 26, completing one entire pressure cycle.

Thereafter, as shown further in FIG. 3, the confining region is swept again, in step 27, to remove any remaining residues 35, in step 28. Then the pressure is raised to superatmospheric again. If desired to repeat the foregoing cycle of steps one or more times, the rise in pressure is accomplished with warm carbon dioxide, in step 29A (shown as a dotted line). Otherwise, the final pressure may be raised much higher, in alternative step 29B (indicated by a dashed line) with cool carbon dioxide, such as preparatory to an intended succeeding hydrolysis or similar chemical conversion of the now pretreated cellulosic material.

Cellulosic material to be treated according to this invention may originate as common forms of biomass, such as trees or bushes, that can be comminuted conveniently to finely divided form. Here "finely divided" means solid particles whose largest dimension is on the order of a millimeter or so (such as about 20 gauge). Finer subdivision of feedstock cellulosic material is neither necessary nor desirable. Cellulosic material previously converted in form, as into packaging, structural, or waste materials may be suitable Comminution may be accomplished by conventional means and methods, as noted, such as chipping, chopping, or shredding, and grinding, ball milling (cold), etc. Preferably, means and methods employed should be of low-temperature type, to avoid any excessive localized heating of the material, as might degrade it chemically as by charring or block it from reagents as by imparting a rather impermeable glaze to normally permeable cell walls, etc.

As already mentioned, the environmental gas of this invention is rich in carbon dioxide, comprising carbon dioxide in major part, and indeed preferably consisting essentially of carbon dioxide. The environmental gas should be substantially free of air and its major constituents and be similarly free of water, as well. The purging or sweeping and decompression steps are intended to remove air, water, acids, alkalis, oils, volatiles, finer particulates (such as dust and smoke), and other undesirable foreign matter from the cellulosic material preliminary to further chemical conversion.

The successive pressurization and depressurization of the material, also the ultrasonic vibration thereof, are effective in improving access of chemical agents to the cellulose interior by opening it up to some extent. The enhanced access to the cellulose interior is ascertainable on a macro scale, as by determining its porosity in conventional manner. The porosity also may be evident microscopically as either a rupturing of cell walls or a fracturing of the matrix within which bundles of cellulose fiber are embedded, or as a fibrillation of some of the fiber bundles themselves.

The gas pressures employed in the anhydrous pretreatment range from a moderate superatmospheric pressure, of at least about several atmospheres, between steps 24 and 25, preferably about a half dozen; to a minor fraction of an atmosphere at full decompression, between steps 25 and 26, being preferably at most a hundredth atmosphere; and to at least about several dozen atmospheres, upon the ultimate recompression, in step 29B, preferably upwards of fifty atmospheres.

The gas temperatures employed in this anhydrous pretreatment range from at least about 25° C., preferably about 35° C., in step 24, to about 0° to 5° C. in step 29B. Higher temperatures are more likely to be undesirably degradative than beneficial.

Practicing the process of this invention does not require any unusual or exotic hardware but can be carried out by means of wholly conventional equipment. This is not to say that various types of equipment may not be more suitable and others less suitable, but opinions will differ in any event, and persons ordinarily skilled in the art are capable of making satisfactory choices without undue experimentation No apparatus is claimed as part of the present invention, so none is shown or described in any greater detail.

The confining region conveniently is within a pressurizable stainless steel housing with a top inlet for the infed material, a side inlet near the top for the environmental gas, a bottom outlet for the pretreated material, and an outlet near the bottom for environmental gas and purged gases, liquids, and very fine solids, such as are mentioned above. Suitable valving at the respective inlets and outlets enables materials to enter and leave, as needed, while suitable gauges or recording indicators permit the pressure and temperature to be monitored satisfactorily.

Despite customary batch loading of the comminuting means, the intermediate mixing means may be unloaded continuously, as by a screw conveyor so as to transition from a batch process to a continuous process. Similarly, the pressurized vessel, shown schematically a separate from preceding and following apparatus, may itself be a screw conveyor. Hence, the particulate material being treated as specified herein, may be treated according to this invention in essentially continuous manner, adapting it to immediately succeeding continuous chemical conversion processes or merely enabling it to be transported continuously, in such pretreated form, to a continuous (or batchwise) conversion site.

Cellulosic material pretreated according to this invention is especially suited to acid hydrolysis, such as for saccharification, which itself may be a waypoint on the road to alcohol manufacture. Other uses for such pretreated cellulose will doubtless come to the minds of persons skilled in the pertinent arts, as the product of this invention becomes a starting material or feedstock for further processing.

Preferred and other acceptable conditions have been mentioned above, including ranges and more or less specific values. Some modifications have been mentioned, and other variants will become apparent, depending upon constraints and goals, materials available to be used, various costs, and other considerations.

Other modifications may be made, as by adding, combining, subdividing, or deleting parts or steps, while retaining at least some advantages and benefits of the present invention, which itself is defined in the following claims.

I claim:

1. A method of pretreating cellulosic material for subsequent conversion by chemical treatment, comprising the steps of confining the material in an anhydrous environment comprising carbon dioxide in at least major part, and subjecting the material to one or more successive pressure cycles, including compressing the confined material in said anhydrous environment to superatmospheric pressure and maintaining it at such pressure for a period of minutes, and then decompressing the compressed material in said anhydrous environment for a further period of minutes, and then returning it to atmospheric pressure, wherein the material is compressed in an atmosphere consisting essentially of carbon dioxide to a pressure of about several atmospheres at a temperature of about 25° C. to 35° C. for at least about a dozen minutes, and then is decompressed to a pressure of a minor fraction of an atmosphere for at least about a half dozen minutes.

* * * * *